(12) United States Patent
Raghavan et al.

(10) Patent No.: US 8,700,673 B2
(45) Date of Patent: Apr. 15, 2014

(54) MECHANISMS FOR METADATA SEARCH IN ENTERPRISE APPLICATIONS

(75) Inventors: Nikhil Raghavan, San Francisco, CA (US); Ravi Murthy, Saratoga, CA (US); Aman Naimat, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/398,792

(22) Filed: Feb. 16, 2012

(65) Prior Publication Data

US 2013/0218898 A1 Aug. 22, 2013

(51) Int. Cl.
*G06F 7/00* (2006.01)

(52) U.S. Cl.
USPC ............................................ 707/798

(58) Field of Classification Search
USPC ............................................ 707/798
See application file for complete search history.

(56) References Cited

U.S. PATENT DOCUMENTS

| | | | |
|---|---|---|---|
| 4,068,300 A | 1/1978 | Bachman | |
| 5,611,035 A | 3/1997 | Hall | |
| 5,724,576 A | 3/1998 | Letourneau | |
| 5,787,432 A | 7/1998 | LeTourneau | |
| 7,437,358 B2 | 10/2008 | Arrouye et al. | |
| 8,307,016 B2 | 11/2012 | Szyperski et al. | |
| 8,356,045 B2 | 1/2013 | Chang et al. | |
| 2001/0032204 A1 | 10/2001 | Hoashi et al. | |
| 2004/0054662 A1 | 3/2004 | Dworkis et al. | |
| 2005/0220351 A1* | 10/2005 | Vanderwende et al. | 382/229 |
| 2005/0289109 A1 | 12/2005 | Arrouye et al. | |
| 2007/0266007 A1 | 11/2007 | Arrouye et al. | |
| 2010/0299356 A1 | 11/2010 | Sedlar et al. | |
| 2011/0106819 A1 | 5/2011 | Brown et al. | |
| 2011/0184932 A1 | 7/2011 | Hennum et al. | |
| 2012/0215785 A1* | 8/2012 | Singh et al. | 707/741 |
| 2013/0218899 A1 | 8/2013 | Raghaven et al. | |

OTHER PUBLICATIONS

U.S. Appl. No. 13/398,799, filed Feb. 16, 2012, Final Office Action, Oct. 19, 2012.
U.S. Appl. No. 13/221,832, filed Aug. 30, 2011 (39 pages).
Aditya, B. et al., "Banks: Browsing and Keyword Searching in Relational Databases" Proceedings of the 28th VLDB Conference, Hong Kong, China, 2002 (http://www.vldb.org/conf/2002/S33P11.pdf) (4 pages).

(Continued)

*Primary Examiner* — Apu Mofiz
*Assistant Examiner* — Ajith Jacob
(74) *Attorney, Agent, or Firm* — Hickman Palermo Truong Becker Bingham Wong LLP Karl T. Rees

(57) ABSTRACT

Metadata search is enhanced by utilizing relationship data indicating relationships between metadata items. A server generates an index mapping metadata items to terms associated with the metadata items and a graph describing relationships between each of the metadata items. When the server receives a search request, the server locates a candidate set of the metadata items based on the search term(s) and the index. The server performs a link analysis of the graph to determine a relationship score for each metadata item. For each particular metadata item in the candidate set of the metadata items, the server calculates a ranking score based at least on the relationship score for the particular metadata item. The server generates a ranked result set based on comparing the ranking scores for the candidate set of metadata items. The server then provides information indicating the ranked result set in response to the search request.

30 Claims, 8 Drawing Sheets

(56) References Cited

OTHER PUBLICATIONS

He, H. et al., "Blinks: Ranked Keyword Searches on Graphs" SIGMOD'07, Jun. 11-14, 2007, Beijing, China (http://www.cs.duke.edu/dbgroup/papers/2007-SIGMOD-hwyy-kwgraph.pdf) (12 pages).

Page, L. et al, "The PageRank citation ranking: Bringing order to the web". Stanford Digital Libraries Working Paper, 1998 (http://ilpubs.stanford.edu:8090/422/1/1999-66.pdf) (17 pages).

U.S. Appl. No. 13/398,799, filed Feb. 16, 2012, Notice of Allowance, Apr. 1, 2013.

* cited by examiner

FIG. 7

MECHANISMS FOR METADATA SEARCH IN ENTERPRISE APPLICATIONS

CROSS-REFERENCE TO RELATED APPLICATIONS

This application is related to U.S. patent application Ser. No. 13/398,794, filed Feb. 16, 2012, entitled "MECHANISMS FOR SEARCHING ENTERPRISE DATA GRAPHS," by Raghavan et al.; and U.S. patent application Ser. No. 13/398,799, filed on Feb. 16, 2012, entitled "DISPLAYING RESULTS OF KEYWORD SEARCH OVER ENTERPRISE DATA," by Raghavan et al., the entire contents of each of which are hereby incorporated by reference for all purposes as if fully set forth herein.

TECHNICAL FIELD

Embodiments relate generally to data search, and, more specifically, to techniques for enhancing search results for metadata.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Structured Data

The data within databases, document repositories, and other data sources are often structured in accordance with a common underlying format. The common underlying format is typically well-understood by general-purpose data access components such as database servers or extended markup language (XML) parsers. Examples of such formats include, without limitation, relational tables, hierarchical trees, and XML.

For many of these underlying formats, conforming structures may be characterized abstractly as sets of hierarchical nodes. For example, in XML and other hierarchical mark-up languages, nodes are delimited by a pair of corresponding start and end tags, which not only delimit the node, but also specify the name of the node. For example, in the following structured data fragment, <A><B>5</B><D>10</D></A>, the start tag <A> and the end tag </A> delimit a node having name A. The data between the corresponding tags is referred to as the node's content. A node's content can either be a scalar value (e.g. integer, text string), or one or more other nodes. A node that contains only a scalar value is referred to herein as a scalar node. A node that contains another node is referred to herein as a structured node. The contained nodes are referred to herein as descendant nodes. In addition to containing one or more nodes, a structured node's content may also include a scalar value. Such content in a node is referred to herein as mixed content.

A structured node thus forms a hierarchy of nodes with multiple levels, the structured node being at the top level. A node at each level is linked to one or more nodes at a different level. Each node at a level below the top level is a child node of a parent node at the level above the child node. Nodes having the same parent are sibling nodes. A parent node may have multiple child nodes. A node that has no parent node linked to it is a root node, and a node that has no child nodes linked to it is a leaf node. For example, in structured node A, node A is the root node at the top level. Nodes B and D are descendant and child nodes of A, and with respect to each other, nodes B and D are sibling nodes. Nodes B and D are also leaf nodes.

In some embodiments, relational tables may be representative of node-based structures. For example, a node may be represented by rows in one or more tables that share a same unique identifier or key. Attributes may be represented by the values for various fields of those rows. Links may be represented by object-identifying values in other columns of those rows. Various other representations may also be used.

Metadata

Structured data may further be organized in accordance with schemas and/or other information that define structural and content constraints for the structured data, beyond those constraints inherent in the underlying structure of that data. Even within the same data source, different structural and content constraints may apply to data objects, such as nodes, that have the same abstract structures. For example, each row of data in a relational database is already subject to constraints inherent to all relational databases. Yet, rows within one table of a database may further conform to schema-dictated constraints for data used to represent customers, while rows within another table in the same database may instead further conform to schema-dictated constraints for data used to represent purchase orders.

The term metadata is used herein to refer to any information, including schemas, that defines structures and/or constraints for structured data. Metadata may comprise one or more units, of varying complexity and granularity, which are hereinafter referred to as items of metadata, or "metadata items." Metadata items may comprise, reference, or embed, other metadata items. Each metadata item may be described as a "node," and each metadata item may be mapped to one or more specific data objects for which it defines constraints. This disclosure may at times refer to a set of metadata items as a "collection of metadata," "metadata collection," or simply "metadata."

Metadata serves, in one aspect, as a blueprint of how data objects are to be constructed. There are many practical applications of metadata, including without limitation the validation of data input and the optimization of processes such as data parsing, data encoding, and data compression. In an embodiment, metadata may comprise a set of formulas, sentences, rules, objects, or other elements expressed in a formalized language, which in turn specify integrity constraints imposed upon one or more data sources.

Metadata may be created explicitly in a variety of manners, including importations of comprehensive top-down schemas by dedicated data architects, or piecemeal input from end-users providing decentralized bottom-up definitions of individual metadata items. Metadata may further be "discovered" through analyses processes that utilize pattern matching, machine learning, and/or other techniques to classify data objects. The metadata that describes a given structured data object may be identified using a variety of mechanisms, including explicit mappings in the form of markup language or type identifiers internal to the data objects, explicit mappings in external tables that map data objects to metadata by references, and mappings determined using structure recognition processes.

One example of metadata is enterprise application metadata, such as may be used for an extended markup language (XML) application platform. Enterprise application metadata may be used to describe a model for a variety of types of data, including XML and database objects, as discussed in the following paragraphs. In an embodiment, the enterprise application metadata model comprises metadata items that are collectively defined by at least three constructs: elements, types, and states. Elements provide a name and semantic meaning to a data item, whereas types and states provide data validation rules. However, in other embodiments the metadata model may comprise additional or fewer constructs. In an embodiment, enterprise application metadata is stored in representative form within a database system. For example, enterprise application metadata may be represented by tables (or objects), columns (or fields), and relationships between tables and columns (or links).

Another example of metadata is an XML schema. An XML schema is a description of a type of XML document. In an embodiment, an XML schema is expressed in terms of constraints on the structure and content of documents of that type, above and beyond the basic syntactical constraints imposed by XML itself. These constraints are generally expressed using some combination of grammatical rules governing the order of elements, Boolean predicates that the content must satisfy, data types governing the content of elements and attributes, and more specialized rules such as uniqueness and referential integrity constraints. In an embodiment, an XML Schema is itself comprised of a variety of inter-related metadata items, including element type declarations, attribute declarations, entity declarations, notation declarations. An XML schema may be expressed in an XML schema language. Specific examples of an XML schema language include, without limitation, Document Type Definition (DTD), XML Schema (as defined by XML Schema, Part 0, Part 1, Part 2, W3C Recommendation, 2 May 2001; XML Schema Part 1: Structures, Second Edition, W3C Recommendation 28 Oct. 2004; XML Schema 1.1 Part 2: Datatypes, W3C Working Draft 17 Feb. 2006; and XML Schema Part 2: Datatypes Second Edition, W3C Recommendation 28 Oct. 2004, the entire contents of each of which are incorporated herein by reference for all purposes), and RELAX NG.

A database schema is yet another example of metadata. A database schema may comprise metadata items that describe any or all of tables, fields, relationships, views, indexes, packages, procedures, functions, queues, triggers, types, sequences, materialized views, synonyms, database links, directories, and so forth. The database schema may be stored in, for example, a data dictionary within the database. Other types of metadata are also within the scope of this disclosure, including, without limitation, Java object models and other object-based frameworks.

It is at times desirable to locate specific items of metadata, for any of a variety of reasons. To this end, in an embodiment, specific items of metadata may be located using keyword searches on item names and/or descriptions. For example, a data administrator may need to identify the structure of a database, or even reorganize the database. Or, a data administrator may wish to re-use pre-existing metadata items or link to existing data objects when developing the structure of a new data repository.

In an embodiment, metadata is developed in a decentralized manner by a number of end-users forming a community. For example, a community of scientists or doctors may subscribe and/or maintain shared metadata and/or data repositories that are accessible via a variety of applications at any number of locations. In such communities, many diverse end-users may create many types of data objects. Other end-users may wish to locate, use, or even build on top of metadata items already defined by the community. An example of decentralized metadata is described in U.S. application Ser. No. 13/221,832, entitled "Validating XML Documents Based on Decentralized Schemas," and filed Aug. 31, 2011, the entire contents of which are herein incorporated by reference for all purposes.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 is a screenshot of a data interface for viewing data that conforms to the constraints defined by various metadata items.

DETAILED DESCRIPTION

Figure 1:
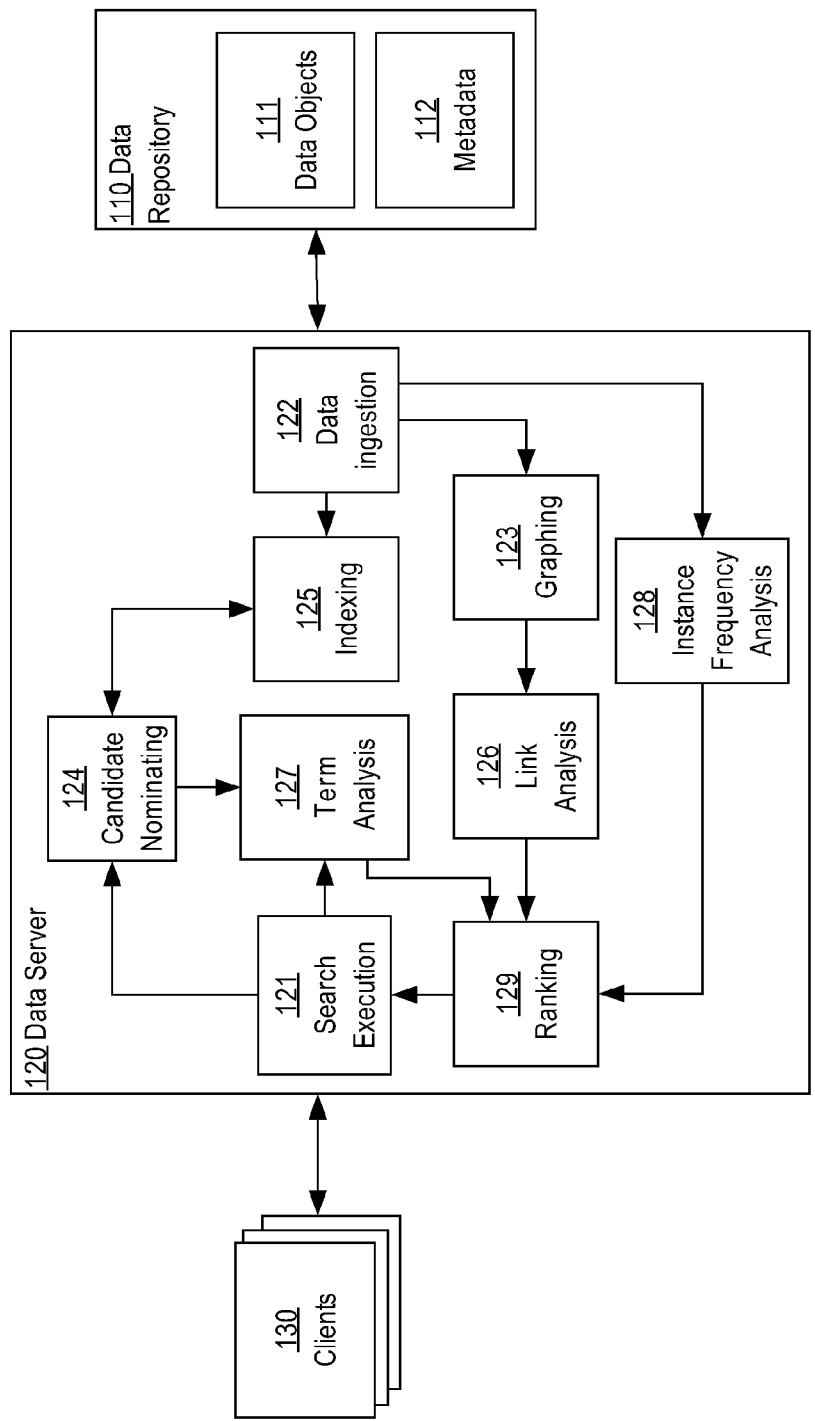
FIG. 1 is a block diagram that illustrates an overview of one embodiment of a system in which the techniques described herein may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
   2.0. Structural Overview
   3.0. Functional Overview
      3.1. Search Request
      3.2. Data Ingestion
      3.3. Indexing
      3.4. Graphing
      3.5. Identifying Candidate Metadata Items
      3.6. Link Analysis Scoring
      3.7. Term-Based Scoring
      3.8. Instance Frequency Scoring
      3.9. Ranking Function
      3.10. Returning the Result Set
      3.11. Variations
   4.0. Implementation Example
      4.1. Example Graph
      4.2. Example MetaData
      4.3. Example Search Interface
      4.4. Example Uses of Search Results
   5.0. Implementation Mechanism—Hardware Overview
   6.0. Extensions and Alternatives

1.0. General Overview

Approaches, techniques, and mechanisms are disclosed for enhancing metadata search by utilizing relationship data indicating relationships between metadata items. In an embodiment, a server generates an index that maps metadata items to terms associated with the metadata items. The server generates a graph describing relationships between each of the metadata items. When the server receives a search request comprising at least one or more search terms, the server locates a candidate set of the metadata items based on the one or more search terms and the index. The server performs a link analysis of the graph to determine a relationship score for each particular metadata item in at least the candidate set of metadata items. For each particular metadata item in the candidate set of the metadata items, the server calculates a ranking score based at least on the relationship score for the particular metadata item. The server generates a ranked result set based on comparing the ranking scores for the candidate set of metadata items. The server then provides information that describes the ranked result set in response to the search request.

In an embodiment, the server also determines one or more term scores for at least each particular metadata item in the candidate set of metadata items, the one or more term scores being based on at least one of the frequency with which the term appears in the particular metadata item or the frequency with which the term appears in all of the metadata items. Calculating the ranking score for each particular metadata item is further based on the one or more term scores for the particular metadata item. In an embodiment, for each particular metadata item in the candidate set of the metadata items, the server further determines an instance frequency score based at least in part on how many data objects in the data repository conform to the particular metadata item. Calculating the ranking score for each particular metadata item is further based on the instance frequency score for the particular metadata item.

In an embodiment, calculating the ranking score for each particular metadata item comprises inputting at least the relationship score for the particular metadata item, the one or more term scores for the particular metadata item, and/or the instance frequency score into a parameterized ranking function. The server may further adjust weights for the parameterized ranking function based on implicit or explicit user feedback data.

In an embodiment, the server identifies the relationships described in the graph based on reference data associating certain metadata items with other certain metadata items. In an embodiment, the relationships include one or more of "child of" relationships, "parent of" relationships, "descendant of" relationships, or "ancestor of" relationships. In an embodiment, the graph comprises nodes and edges, the nodes corresponding to metadata items and the edges corresponding to the relationships, wherein at least some of the edges have different weights corresponding to different types of relationships that are represented by the edges.

In an embodiment, the relationship score for each particular metadata item is based at least in part on how many of the metadata items depend upon the particular metadata item. In an embodiment, the graph is a directed graph, wherein the relationship score for each particular metadata item is a function of how many edges lead into the node corresponding to the metadata item.

In an embodiment, the server revises the set of one or more search terms prior to locating the candidate metadata items based on or more of a spelling correction engine, an autocomplete engine, or a query reformulation engine.

In an embodiment, the techniques are performed in a system comprising a client with a user interface configured to redefine, add, or otherwise manage the metadata in the data repository. The server receives, via this client, definition data for a new metadata item that references a first metadata item in the result set. The server adds the new metadata item to the data repository. The server then enforces one or more constraints described by the new metadata item and the first metadata item on a particular data object within the data repository.

In an embodiment, a server generates an index that maps metadata items to terms associated with the metadata items. When the server receives a search request comprising at least one or more search terms, the server locates a candidate set of the metadata items based on the one or more search terms and the index. For each particular metadata item in the candidate set of the metadata items, the server determines an instance frequency score based at least in part on how many data objects in the data repository conform to the particular metadata item. For each particular metadata item in the candidate set of the metadata items, the server calculates a ranking score based at least on the instance frequency score for the particular metadata item. The server generates a ranked result set based on comparing the ranking scores for the candidate set of metadata items. The server then provides information describing the ranked result set in response to the search request.

In other aspects, the invention encompasses computer apparatuses and a computer-readable media configured to carry out the foregoing steps.

2.0. Structural Overview

FIG. 1 is a block diagram that illustrates an overview of one embodiment of a system 100 in which the techniques described herein may be implemented, according to an embodiment. System 100 comprises a data server 120 that is coupled to a data repository 110 and multiple clients 130 via one or more networks 140. System 100 is but one example of a system in which the techniques described herein may be practiced. Other systems for practicing the techniques described herein may include fewer or additional components, in varying arrangements.

Data repository 110 includes data objects 111 and metadata 112. Data repository 110 may comprise any type(s) of data source(s), including without limitation a relational database, an XML document collection, a multidimensional database, flat files, and so forth. Data repository 110 may be stored in a central location, or distributed amongst multiple locations. Data objects 111 may conform to any of a variety of underlying formats, including XML and/or relational database objects. Metadata 112 may likewise take any one or more of the forms described elsewhere in this application. In an embodiment, data repository 110 is little more than a storage system that communicates conventional data blocks to data server 120 via conventional I/O operations. In embodiments, data repository 110 may comprise data handling components such as an XML parser or database server.

Data server 120 comprises a search execution component 121 for receiving, processing, and returning search results to clients 130. In some embodiments, the search execution component 121 may be assisted by an ingestion component 122, graphing component 123, candidate nominating component 124, indexing component 125, link analysis component 126, term analysis component 127, instance frequency analysis component 128, and/or ranking component 129. The varying functions of each of these components are described in subsequent sections. An example information flow for communications between the components is depicted in FIG. 1;

however, many other information flows are also possible. Each of these components may be logically separate and distinct components, some or all of these components may be part of the same component, and/or the functionality performed by these components may be divided amongst other components.

Though not depicted, data server 120 may further include a variety of other components. For example, data server 120 may include data access components that communicate with data repository 120 via conventional I/O operations. Data server 120 may further include components such as an XML parser, state machine, or database server, if appropriate. Data server 120 may further include components such as a web server or application server. For example, data server 120 may utilize a web server to respond to search requests from one of clients 130. Some embodiments may include additional data servers 120, which in turn include their own copies or versions of some or all of the components described above.

Clients 130 may include standalone clients such as web browsers, integrated development environments, and/or other desktop applications executing at end-user workstations. Clients 130 may also or instead include middleware applications executing at application servers, which may themselves be in communication with end-user workstations or other clients 130. System 100 may include any number of clients 130, and some or all of clients 130 may execute on some of the same computing devices as server 120.

Clients 130 may issue a variety of data-oriented requests to data server 120, including search requests. Depending on the embodiment, clients 130 may issue search requests to data server 120 in any of a variety of suitable forms using any of a variety of protocols, including HTTP, SQL, XML, and so forth. In an embodiment, each of the search requests indicates a search operation that data server 120 is to perform by searching metadata 112. Clients 130 also receive responses to the search requests from data server 120 in any of variety of suitable forms using any of a variety of protocols. For example a first client 130 may receive a web page containing table-formatted search results, while another client 130 may receive search results in the form of a ResultSet, JSON object, XML stream, or any other suitable structure.

As a practical matter, the use of a computer system in claimed embodiments is required. For example, data server 120 may be implemented by one or more computer systems executing collectively as a server. The components thereof may, for example, be implemented by one or more hardware processors of those one or more computer systems, configured to execute instructions for performing the various functions described herein. The techniques described herein should not be construed in any way as being amendable to being performed mentally or manually. Example computer systems that may be used to implement an embodiment include the computer systems described with respect to FIG. 8 and the servers configured to execute XAP applications described in U.S. patent application Ser. No. 12/782,591, entitled TYPE SYSTEM FOR BUILDING EXTENSIBLE BUSINESS APPLICATIONS, filed on May 18, 2010 by Eric Sedlar, et al., the contents of which are incorporated herein by reference for all purposes as if set forth in their entirety, and referred to hereafter as the XAP patent application.

3.0. Functional Overview 3.1. Search Request

Figure 2:
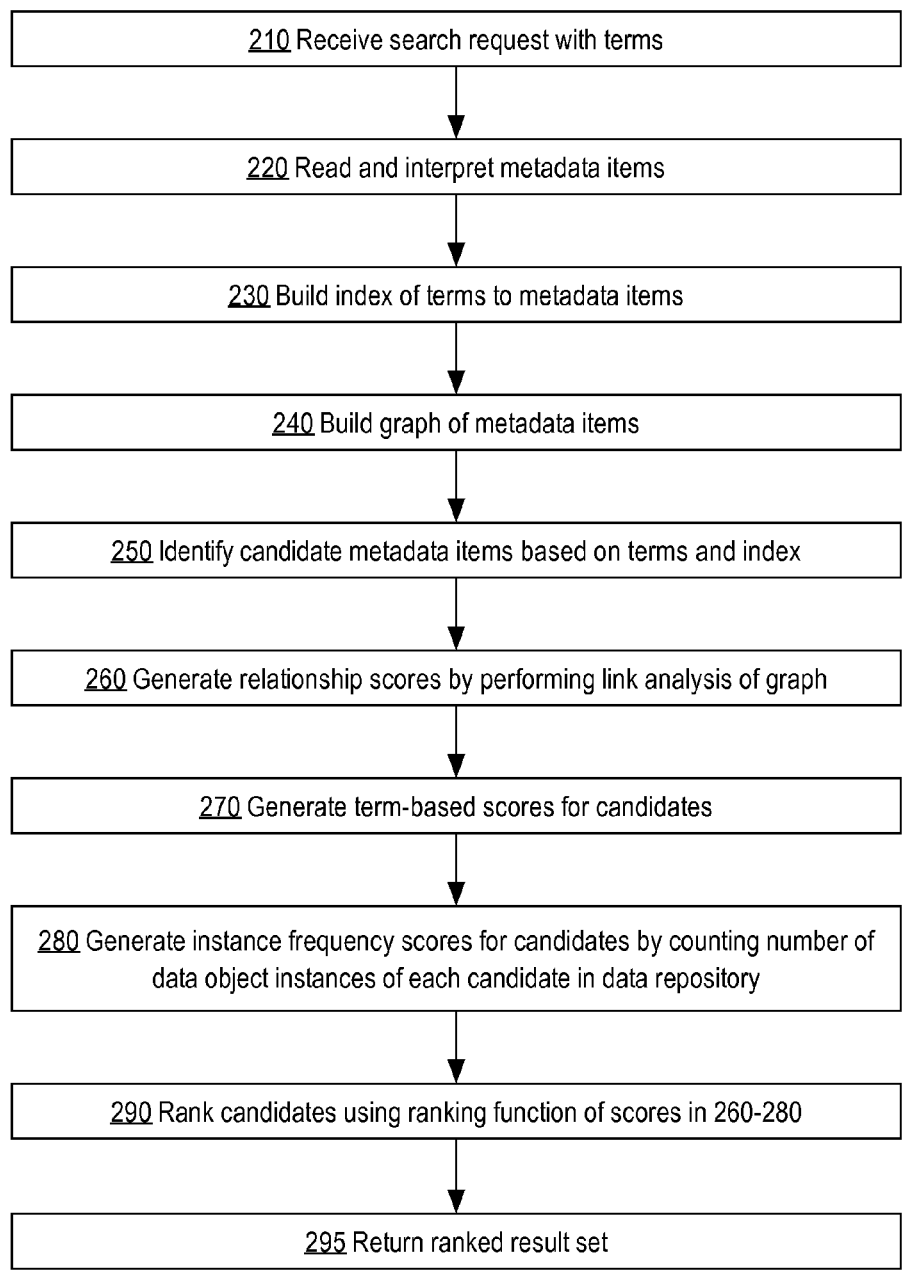
FIG. 2 depicts a flow for executing a keyword-based search for metadata.

FIG. 2 depicts a flow 200 for executing a keyword-based search for metadata, according to an embodiment. At block 210, a server receives a search request. The search request comprises search criteria, including one or more terms (or "keywords"). The server may be any computing device, or component thereof, capable of performing a search on metadata such as metadata 112. For example, the criteria may be received by search execution component 121 of data server 120, or by a standalone indexing service that accesses a local repository of metadata at a client computer. The terms may have been entered, for instance, via user input received at any suitable search interface presented by a client computer, such as one of clients 130. Or, as another example, the terms may have been provided programmatically from an application via an application programming interface. The terms may or may not be accompanied by other search criteria, including any of a variety of filters or search parameters supported by the search execution component.

3.2. Data Ingestion

At block 220, the server reads data structures from a data repository and interprets those structures as a collection of metadata items. The server determines which data structures to read as metadata by searching for tables, documents, or document collections, in or external to the data repository, that have been marked as metadata. For example, the metadata may be in a designated system table or folder. Or, the metadata may be a collection of XML defined within a common namespace. The ingested metadata may be the entire set of metadata for the data repository. Or the read metadata may just be a subset of the available metadata, filtered by any of a variety of implicit or explicit search criteria, including without limitation permissions, identifiers, categorical information, type data, user groups, re-usability criteria, and so forth. The server may utilize, for example, ingestion component 122 to perform the reading and interpretation. For each metadata item, the search execution component extracts constituent contents, tags, and/or links. The reading and extraction may involve, for instance, an XML parser and/or one or more queries.

3.3. Indexing

At block 230, the server builds an index that maps metadata items to terms associated with the metadata items. The server may utilize, for example, indexing component 125 to perform the indexing. In an embodiment, the index is an inverted index in which each term is linked to a set of metadata items. The terms linked to a particular metadata item are selected from the particular metadata item's constituent contents and/or tags. In an embodiment, the indexed terms are selected only from content associated with certain fields or tags. For example, the indexed terms may be selected from content associated with descriptive tags, such as user-annotations, categorical information, labels, and names. In an embodiment, indexed terms may further be selected from certain types of related metadata items.

The index may be built using any suitable indexing technique. For example, in one embodiment the metadata items are transformed into a vector of indexable documents and composed into fields and values. Fields can be stored, indexed, or any combination thereof. To limit the amount of space used by the indexing, the number of indexed fields is minimized. The documents are then added to the inverted index.

3.4. Graphing

At block 240, the server generates a graph describing relationships between each of the metadata items. The server may utilize, for example, a graphing component 123 to generate the graph.

As used herein, a graph is a description of a collection of items that has been optimized for the purpose of identifying relationships between those items during a link analysis of the collection. In an embodiment, a graph of a collection of metadata item comprises, simply, a node for each metadata item and, for each particular node, one or more edges that each identify another node to which the particular node is related. However, the graph may comprise additional information as well. For example, edges or sets of edges may be associated with a relationship type indicator that indicates the type of relationship that exists between the source and destination nodes.

In an embodiment, the graph is stored entirely in-memory for fast traversal during a link analysis. However, the graph may also or instead be stored in other mediums. The graph may be stored in any suitable structures, including without limitation object collections, arrays, and/or hash tables. For example, the graph may comprise a top level array indexed to unique identifiers for each metadata item, with each particular element of the array comprising a separate second level array listing unique identifiers of the metadata items that are related to the particular metadata item represented by the particular element.

Relationships

Block 240 may involve identifying the relationships between each metadata item so as to construct the edges of the graph. Depending on the embodiment, two metadata items may be identified as related for any of a variety of reasons. In an embodiment, a metadata item is identified as being related to another metadata item if the metadata item explicitly links to the other metadata item. For example, an XML-based metadata item may explicitly reference an identifier of another metadata item in a href attribute, XLink, or other field. In an embodiment, a metadata item is identified as being related to another metadata item if the other metadata item is embedded within, inherits from, or is a container of the metadata item. In an embodiment, a metadata item is identified as being related to another metadata item if the metadata item is a state or type of the other metadata item. In an embodiment, a relationship may be discovered by following multiple links. For example, if a parent metadata item explicitly references a child metadata item, which in turn explicitly references its own child metadata item, the parent metadata item may be identified as related to the child's child by dependency even if the parent metadata item does not directly reference the child's child.

In an embodiment, each relationship is typed depending on the manner in which it was identified. For example, some examples of relationship types include "child of," "parent of," "descendent of," "ancestor of," "state of," and "type of." Each type is not necessarily weighted equally. For example, a "Sibling of" type may be weighted much lower than a "Child of" relationship type. Some types of relationships may not be included in the graph at all. In an embodiment, all identified relationships are weighted equally, and therefore need not necessarily be typed.

In an embodiment, only relationships that indicate dependencies are graphed. That is, a metadata item is indicated as related to another metadata item only if the definition of that metadata item relies upon the definition of the other metadata item. For example, processing rules for a metadata item corresponding to a shipping order may depend upon information in defined for a metadata item corresponding to a shipping address, but the inverse may not be true.

In an embodiment, the edges in the graph are directional originating from a referencing object to a referenced object. For example, a parent metadata item that is required to have a child metadata item would have an edge to the child metadata item, but the child metadata item would not have an edge to the parent metadata item. As another example, a first metadata item that inherits a definition from second metadata item would have an edge to the second metadata item, but the second metadata item would not have an edge to the first metadata item.

3.5. Identifying Candidate Metadata Items

At block 250, the server identifies a set of candidate metadata items responsive to the search request. The server, or a candidate nominating component 124 thereof, utilizes the terms received in block 210 to locate candidate items in the index of block 230, using any suitable information retrieval technique. For example, the server may look up each of the terms in the index, and add to the set of candidate items those metadata items that are indexed under any of terms. Terms may be single words or sets of words. In an embodiment, the search criteria may include conventional search directives to indicate how the terms should be utilized. For instance, one or more directives may indicate that only metadata items indexed to each of a certain combination of search terms are considered candidates.

In an embodiment, the server may modify the set of terms before looking up candidate items, so as to eliminate terms not likely to be of interest, add additional terms of potential interest, correct spelling errors, and so forth. Example modification techniques are as follows.

Query Reformulation

Search requests are sometimes expressed using terms that are semantically similar to the terms found in the metadata items, but nonetheless different. To account for semantic similarity, the search request may be reformulated by adding (or replacing terms with) synonyms, hypernyms, hyponyms, and so forth. In an embodiment, the terms may be further reformulated using a tagger implemented as a Hidden Markov Model or a Conditional Random Field, trained apriori to provide a part-of-speech tag to each query term. Desired parts-of-speech such as nouns or noun phrases may be located by calling into a WordNet index to apply the correct tense based on query expansion to the original terms in the query.

In an embodiment, the original terms and the reformulated terms may be used to retrieve two different sets of results. Results retrieved from the expanded query may be down-weighted during the ranking of block 290 in comparison to results returned from the original query.

Spelling Correction

In an embodiment, terms for the search request may be automatically passed into a suitable spelling correction engine composed of a dictionary of terms and phrases used in the existing metadata items. Misspelled words may be automatically replaced, or proper spellings may be added to the set of search terms. Spelling correction may further rely on the availability of query logs for highly relevant corrections. In the absence of query log information during a system bootstrap, a manually curated list of queries may be injected into the query log. For example, the list of candidate queries may be the titles of each metadata item. Each of these titles is treated as if it were a real query posed by a real user and injected at system bootstrap time into the spelling dictionary and the query logs. In an embodiment, a candidacy test is performed on terms that have been identified as misspelled. If those terms do in fact produce results within the collection of metadata, the terms may also be added to the dictionary.

Auto-Complete

In an embodiment, a query log index maintained for spelling correction may be further leveraged for providing suggestions for query completion. Auto-completion is an interactive process whereby a list of suggested query completions is continuously refined with each typed keystroke in the search box. If resources are available, results may also be provided based on the highest ranking suggestion. Query completions may be used to reduce the amount of typing activity and the rate of misspellings. They also serve as a quick preview into the available concepts or constructs in the metadata.

3.6. Link Analysis Scoring

At block 260, the server performs a link analysis of the graph of block 240 to produce a relationship score for at least each candidate metadata item. The link analysis may be performed by a component such as link analysis component 126. In an embodiment, the link analysis is configured to measure the relative importance of each item in a set of items, which in this case is the metadata collection (or, in some embodiments, just the candidate set thereof). Metadata items that are more heavily used (or reused) within the metadata collection have higher scores than lesser used metadata items. In an embodiment, the link analysis involves, in part, assigning weights to the edges and nodes in the graph, with a node's weight being proportional to that node's indegrees. The weights are then used to calculate a score reflecting the relative importance of each node.

Any technique or combination of techniques that return a numerical score for items based on a graph may be utilized for the link analysis. Examples of algorithms for link analysis include, without limitation, Hyperlink-Induced Topic Search, PageRank, CheiRank, TrustRank, and variations thereof. For example, in an embodiment scores are calculated by executing an iterative or algebraic PageRank algorithm, such as described in L. Page, S. Brin, R. Motwani, and T. Winograd. The PageRank citation ranking: Bringing order to the web. Stanford Digital Libraries Working Paper, 1998, the entire contents of which are hereby incorporated by reference for all purposes as if set forth herein.

3.7. Term-Based Scoring

At block 270, the server generates one or more term scores for each of the candidate metadata items. The term scoring, which may be performed for instance by term analysis component 127, may involve any suitable term-based scoring technique that generates one or more scores for each particular metadata item based at least on the search terms and the particular item. For example, the server may assign term frequency scores for each term based on how many times each term appears in the metadata item. The scores are optionally weighted, and then combined to produce a final term score for the metadata item. In an embodiment, the final term score may be a function of an inverse document frequency score for each term, which may or may not have been determined in advance. The inverse document frequency indicates the uniqueness of the term in the metadata collection, or the likelihood that it will appear in a given metadata item. In an embodiment, the term score for each particular metadata item is a vector space scoring based on the term frequency score and the inverse document frequency score for each term.

3.8. Instance Frequency Scoring

At block 280, the server generates an instance frequency score for each of the candidate metadata items. The server may generate this score, for instance, using instance frequency analysis component 128.

The instance frequency score for each particular metadata item reflects the number of data objects within a certain data set that are instances of the particular metadata item. In other words, the instance frequency score reflects the number of data objects in a data repository to which the constraints imposed by a particular metadata item apply. The score may be an exact number of data objects, or the score may be a function of the number of data objects. The score may reflect the number of data objects within an entire data repository, or a more limited set of data objects, such as data objects belong to a particular user group or created within a certain time period. Additionally, the score may be a function of time-based and other optimizing factors, such as how recently each data object instance of the particular metadata item was accessed or created.

3.9. Ranking Function

At block 290, the server utilizes some or all of the various scores calculated in blocks 260-280 to calculate a ranking score for each candidate metadata item. The server may utilize, for instance, ranking component 129 to calculate the ranking. Any suitable ranking technique may be utilized. For example, the final ranking score may simply be a total of each score in blocks 260-280.

In an embodiment, each score of block 260-280 is weighted as part of a parameterized ranking function. For instance, the relationship score for a metadata item may contribute more or less significantly to the ranking score than the term-based score. In an embodiment, the ranking score is $S(n)=Lambda(V(n))+(1-Lambda)*(P(n))$, where $S(n)$ is the combination score of an item (or node–n), $V(n)$ is a vector space score of n, $P(n)$ is a relationship score of (n), and Lambda is a combination co-efficient that essentially weights $V(n)$ and $P(n)$. The combination score could either be additive of multiplicative.

In an embodiment weights are assigned by an expert, and modified throughout deployment as needed. In an embodiment, the weights are learned and/or relearned using any suitable machine learning mechanism, including without limitation linear regression algorithms, gradient descent algorithms, expectation-maximization algorithms, and/or Dynamic Bayesian Networks. The machine learning mechanisms may utilize, for instance, logs of search requests and corresponding click-through data for search results.

In an embodiment, additional scores reflecting other relevance signals may also be incorporated into the ranking function.

3.10. Returning the Result Set

At block 295, the server generates a final result for the search request and provides data indicating each metadata item in the result set to the user. The server may do so, for instance, by comparing the ranking scores for each candidate metadata item. The candidate metadata items are sorted by their ranking scores and returned as the final result. In an embodiment, the final result may comprise less than the number of candidate items. For example, candidate metadata items below a pre-defined threshold score may be pruned. As another example, only a top predefined number of candidate metadata items may be returned.

The result set may be returned in a variety of forms, including XML, tables, web pages, and so forth. In an embodiment, the result set is returned in a web page comprising a name and description of each metadata item in the result set, and further featuring controls for performing various actions with each metadata item, such as locating data object instances of the metadata item or seeing an XML representation of the metadata item. In an embodiment, the result set is returned as a list of metadata item identifiers, by which a client may look up and retrieve any information necessary to generate its own display of information about the metadata items in the result set.

3.11. Variations

Flow 200 is but one example of a flow for executing searches using the described techniques. Other flows may feature fewer or additional elements, in varying orders. For example, some flows may omit the calculation of any of the scores determined in blocks 260-280. Generation of a graph that is separate from the metadata itself may also be optional in embodiments that omit the link analysis or perform the link analysis by traversing references in the metadata collection directly. As another example, some or all of blocks 220, 230, 240, 260 and 280 may be performed at any time relative to the search request. For instance, the server may execute background processes for building indices and graphs in advance of the search request, and then cache the index and graph for use in any number of search results. The indices and graphs may be updated or rebuilt periodically or in response to trigger events, such as significant changes to the metadata. Depending on the resources available to the server, blocks 260, 280, and even portions of block 270 may also be performed in advance for quicker search request response time. Other variations may include, without limitation, calculating multiple different relationship scores or instance frequency scores for each metadata item.

In an embodiment, other search criteria received in the initial search request may also affect the search. For example, the initial search request may specify constraints on the metadata that is searched, additional ranking factors, sort orders, and so forth.

4.0. Implementation Example

4.1. Example Graph

Figure 3:
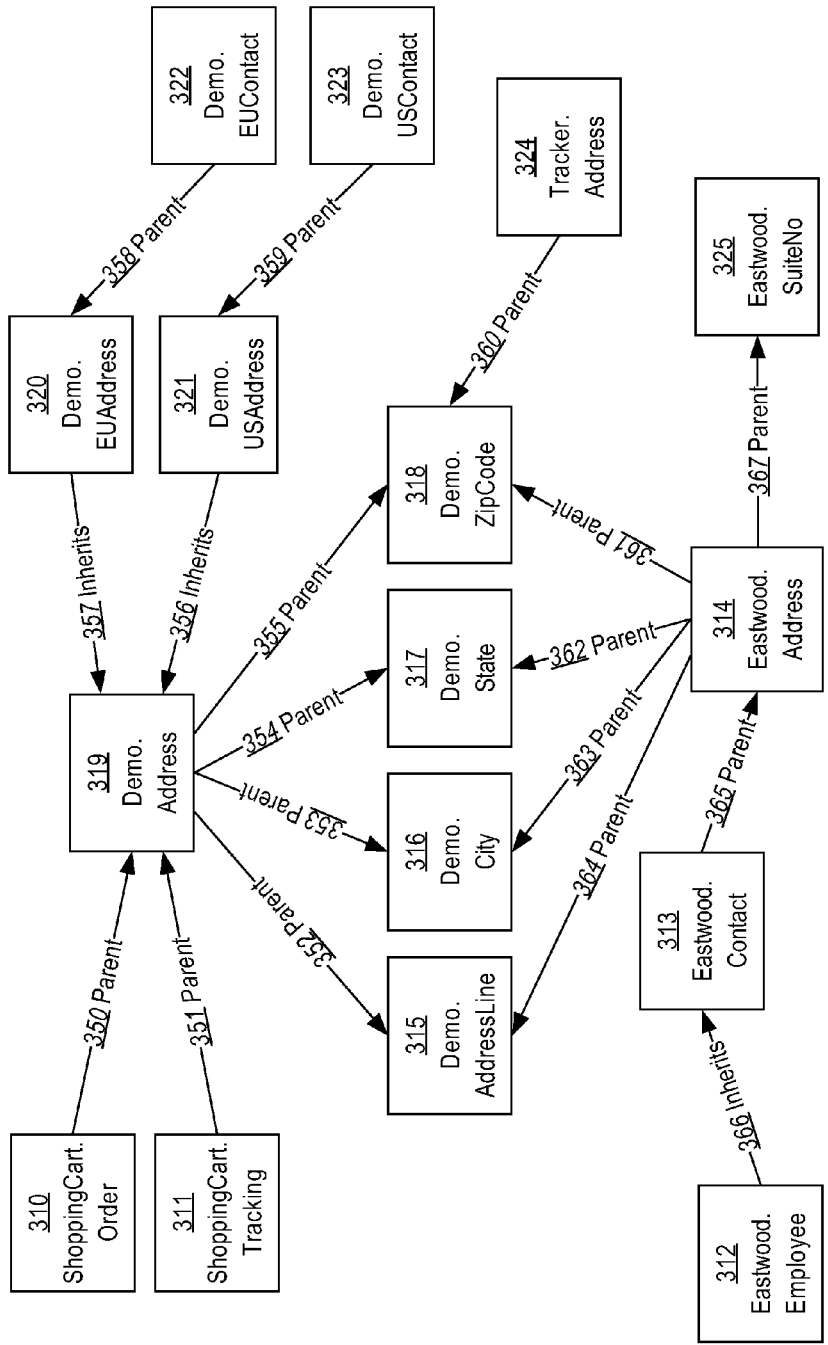
FIG. 3 is a block representation of a graph of metadata items.

FIG. 3 is a block representation of a graph 300 of metadata items, in accordance with an embodiment of the invention. FIG. 3 comprises a plurality of nodes 310-325 and a plurality of edges 350-367. Each of nodes 310-325 represent a searchable metadata item in a repository of metadata items. Each of edges 350-367 represent dependency relationships of nodes 310-325. Graph 300 is not necessarily a complete graph of a metadata collection, but rather illustrative of the graphing techniques described herein.

For example, node 319, labeled "Demo.Address," is indicated by the directional arrow of edge 353 to have a "Parent of" relationship with node 316, labeled "Demo.City," and is accordingly dependent upon node 316. Similarly, node 314, labeled "Eastwood. Address," is indicated by the directional arrow of edge 363 to be a "Parent of" node 316, and is accordingly also dependent upon node 316. As another example, node 320, labeled "Demo.EUAddress" is indicated by the directional arrow of edge 357 to have an "Inherits From" relationship with node 319, labeled "Demo.Address," and is accordingly dependent upon node 319.

In an embodiment, a simple link analysis of graph 300 would produce a relationship score for each node 310-325 that is equal to the number of edges 350-367 that are directed into the node. For instance, Demo.Address node 319 has four edges 350, 351, 358, and 359 that are directed into it. Demo.Address node 319 would thus have a relationship score of 4. Meanwhile, Eastwood.Address node 314 would only have a relationship score of 1, since only node 365 is directed into it. All other factors being equal, then, a search for the term "address" would return Demo.Address node 319 ahead of Eastwood.Address node 314.

In other embodiments, more complex link analyses would produce different relationship scores for each node. For instance, in an embodiment, each node begins with an equal relationship score, and the link analysis involves iteratively transferring a portion of each node's relationship score to all nodes that the node transitions into. In an embodiment, the relationship score for each node is also a function of weights assigned to the different types of edges leading into the node.

4.2. Example Metadata

According at an embodiment, metadata for a repository such as data repository 110 may be specified using an XML syntax set forth within a namespace known as XAP, as discussed in the XAP patent application. The XAP syntax comprises three main constructs: an element construct, a type construct, and a state construct. As an example, the metadata item corresponding to the Demo.Address node 319 of graph 300, depicted in FIG. 3, may be an element construct described by the following XML:

```
<xap:element xmlns:xap="http://xap.oracle.com" xap:docid="A6" xa
    p:id="_0">
<xap:name xap:id="_1">address</xap:name>
<xap:uri xap:id="_2">http://xap.oracle.com/demo</xap:uri>
<xap:label xap:id="_3">Address</xap:label>
<xap:defaultType xap:href="/xap/sys/get?docid=B3" xap:id="_4"/>
<xap:description xap:id="_5">A address has the following fields : -
    addressline - city - state - zipcode</xap:description>
</xap:element>
```

Among other aspects, the various tags, attributes, and contents of the above description provide the Address metadata item with a name ("address"), namespace ("http://xap.oracle.com/demo"), and a description ("A address has the following fields: -addressline-city-state-zipcode"). The "xap:defaultType" tag further provides a type definition of the internal structure to expect, by default, from any data object conforming to this metadata item. In this particular case, the type definition is provided by way of an "xap:href" attribute, which is a reference to type construct having an internal identifier of "B3." The type construct B3 is therefore said to have a "Type Of" relationship with the element construct set forth above.

An XML description of the B3 type construct may be as follows:

```
<xap:type xmlns:xap="http://xap.oracle.com" xap:docid="B3" xap:id
    ="_0" xap:states="104">
<xap:name xap:id="_1">Address</xap:name>
<xap:uri xap:id="_2">http://xap.oracle.com/demo</xap:uri>
<xap:elementRef xap:href="/xap/sys/get?docid=A6" xap:id="_3"/>
<xap:defaultState xap:href="/xap/sys/get?docid=BA" xap:id="_4"/>
<xap:label xmlns:xap="http://xap.oracle.com" xap:id="_9">Address
    </xap:label>
</xap:type>
```

The above XML description provides a variety of information similar in nature to that set forth in the element construct for the Address metadata item. Of further interest, the "xap:elementRef" tag may be used to provide backwards relationship information by which element constructs that refer to the type construct may be located. The "xap:defaultState" tag further provides a description of a default state for constraints that should be applied to any data object conforming to the type construct. The state definition is provided by way of reference to a state construct having an XAP identifier of "BA." A "State Of" relationship is therefore established between the B3 type construct and the BA state construct.

An XML representation of the BA state construct may be as follows:

```
<xap:state xmlns:xap="http://xap.oracle.com" xap:docid="BA"
    xap:id="_0">
<xap:name xap:id="_1">Address</xap:name>
<xap:uri xap:id="_2">http://xap.oracle.com/demo</xap:uri>
<xap:typeRef xap:href="/xap/sys/get?docid=B3" xap:id="_3"/>
<xap:constraint xap:id="_4">
<xap:subelement xap:id="_5"><xap:elementRef
    xap:href="/xap/sys/get?docid=92"
    xap:id="_6"/></xap:subelement>
</xap:constraint>
<xap:constraint xap:id="_7">
<xap:subelement xap:id="_8"><xap:elementRef
    xap:href="/xap/sys/get?docid=93"
    xap:id="_9"/></xap:subelement>
</xap:constraint>
<xap:constraint xap:id="_10">
<xap:subelement xap:id="_11"><xap:elementRef
    xap:href="/xap/sys/get?docid=94"
    xap:id="_12"/></xap:subelement>
</xap:constraint>
<xap:constraint xap:id="_13">
<xap:subelement xap:id="_14"><xap:elementRef
    xap:href="/xap/sys/get?docid=95"
    xap:id="_15"/></xap:subelement>
</xap:constraint>
</xap:state>
```

The above XML description provides a variety of information similar in nature to that set forth in the previous element and type constructs. Of further interest, the "xap:constraint" tag is used four times to specify constraints for data objects when in the state specified by the BA construct. In particular, four "xap:subelement" constraints are defined, describing children nodes that are to exist when the data object is in the state specified by the BA construct. The children nodes are described by references to yet other element constructs, thereby establishing "Subelement of" relationships between the BA state construct and each of the other element constructs.

The required child nodes of data objects that conform to the Address metadata item, while in the default type and state, may be described by the following XML representations:

```
<xap:element xmlns:xap="http://xap.oracle.com" xap:docid="92"
    xap:id="_0">
<xap:name xap:id="_1">addressline</xap:name>
<xap:uri xap:id="_2">http://xap.oracle.com/demo</xap:uri>
<xap:label xap:id="_3">AddressLine</xap:label>
<xap:datatypeRef xap:href="/xap/sys/get?docid=82" xap:id="_4"/>
<xap:description xap:id="_5">The address line.</xap:description>
</xap:element>
<xap:element xmlns:xap="http://xap.oracle.com" xap:docid="93"
    xap:id="_0">
<xap:name xap:id="_1">city</xap:name>
<xap:uri xap:id="_2">http://xap.oracle.com/demo</xap:uri>
<xap:label xap:id="_3">City</xap:label>
<xap:datatypeRef xap:href="/xap/sys/get?docid=82" xap:id="_4"/>
<xap:description xap:id="_5">The city name in
    address.</xap:description>
</xap:element>
<xap:element xmlns:xap="http://xap.oracle.com" xap:docid="94"
    xap:id="_0">
<xap:name xap:id="_1">state</xap:name>
<xap:uri xap:id="_2">http://xap.oracle.com/demo</xap:uri>
<xap:label xap:id="_3">State</xap:label>
<xap:datatypeRef xap:href="/xap/sys/get?docid=82" xap:id="_4"/>
<xap:description xap:id="_5">The state name in
    address.</xap:description>
</xap:element>
<xap:element xmlns:xap="http://xap.oracle.com" xap:docid="95"
    xap:id="_0">
<xap:name xap:id="_1">zipcode</xap:name>
<xap:uri xap:id="_2">http://xap.oracle.com/demo</xap:uri>
<xap:label xap:id="_3">Zipcode</xap:label>
<xap:datatypeRef xap:href="/xap/sys/get?docid=82" xap:id="_4"/>
<xap:description xap:id="_5">The zip code in
    address.</xap:description>
</xap:element>
```

The above XML sets forth definitions for the metadata items "AddressLine Element," "City Element," "State Element," and "Zipcode Element," corresponding to nodes 315-318 of graph 300. These elements are scalar data type elements, subject to the constraints imposed by yet another metadata item, having the XAP identifier of 82, which is not described herein, but corresponds to simple strings.

An XML representation of a single data object that conforms to the constraints set forth by the above metadata items is as follows:

```
<?xml version="1.0" encoding="UTF-8"?>
<demo:address xmlns:demo="http://xap.oracle.com/demo"
    xmlns:xap="http://xap.oracle.com" xap:docid="E6"
    xap:id="_0" xap:states="174">
<demo:address xap:id="_8" xap:states="172">
<demo:addressline xap:id="_9">123 Main St.</demo:addressline>
<demo:city xap:id="_10">Redwood Shores</demo:city>
<demo:state xap:id="_11">CA</demo:state>
<demo:zipcode xap:id="_12">94065</demo:zipcode>
</demo:address>
```

An XML parser would recognize that the above data object is to conform to the above metadata using the reference to the namespace set forth by the "xmlns:demo" attribute of "demo:address" and the reference to specific element construct definitions set forth by each tag's name.

In an embodiment, some or all of the information in the above XML definitions of metadata items may be subject to a indexing, per the techniques described herein. In an embodiment, only "description," "name," and "label" may be indexed. In an embodiment, a search is only performed on element constructs, and thus only element constructs are indexed. Relationships between element constructs, such as "Child of," "Descendent of," and "Parent of" may be derived from following references from one element construct to another element construct. However, metatdata searching need not be limited to any particular type of construct or any particular type of relationship.

The above example is but one way that data and metadata may be represented. A variety of other representations are also possible, including other XML-based representations. Other kinds of relationships and constraints may also be defined using any suitable technique.

4.3. Example Search Interface

Figure 4:
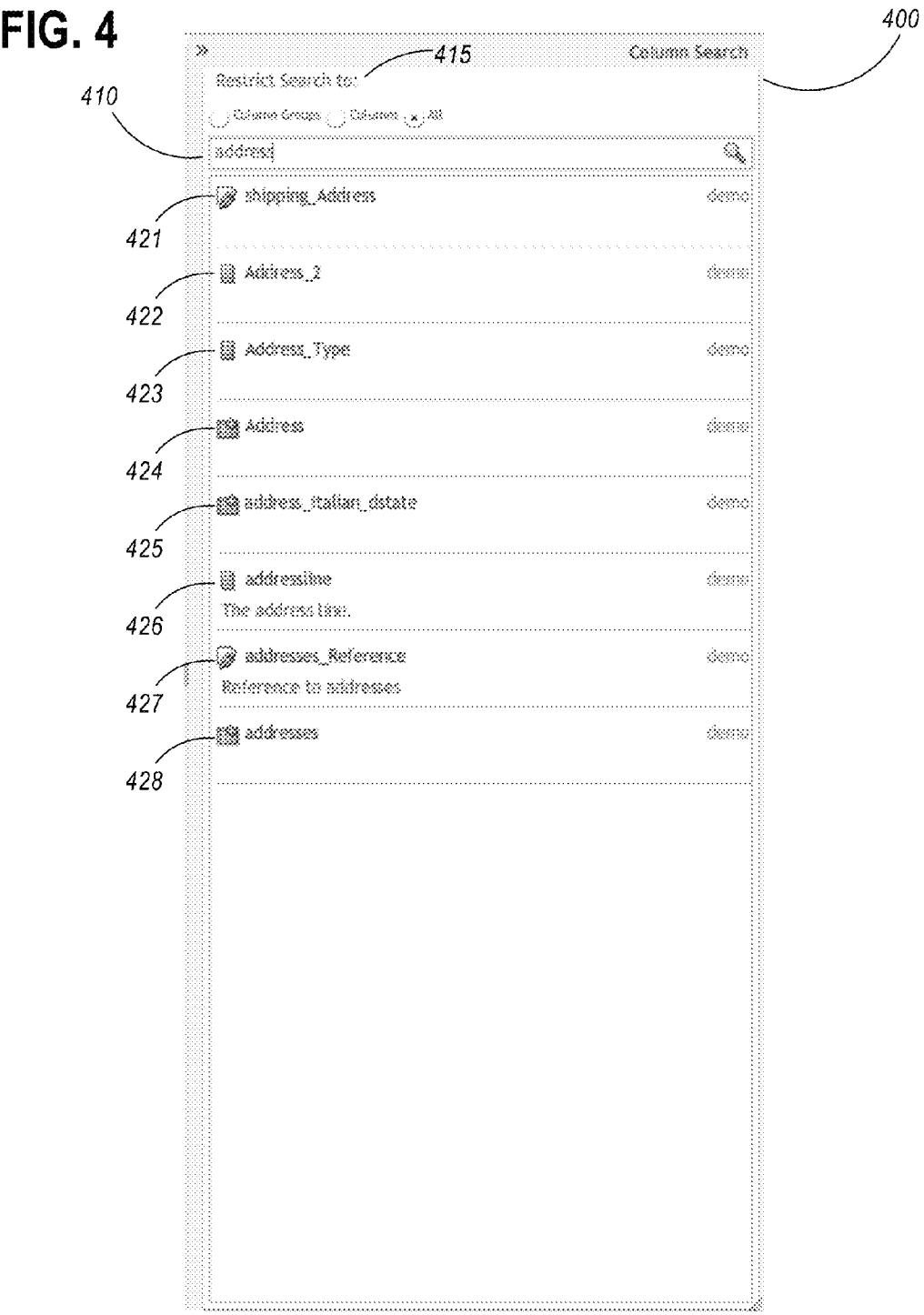
FIG. 4 is a screenshot of an example search interface.

FIG. 4 is a screenshot of an example search interface 400, according to an embodiment. Interface 400 may be, for example, a sidebar of a client-based Integrated Developer Environment (IDE) or a web page. A user enters one or more search terms, such as "address," in search box 410. A user may also enter additional search criteria via controls 415. Upon the user indicating that the search criteria have been provided by, for instance, pressing an "Enter" key while focused in search box 410, the client submits a search request to a search execution component. Based on a listing of identifiers returned from the search execution component, the client looks up information about each returned metadata item. The client then formats the information as search results 421-428. Search results 421-428 may comprise any information about the metadata item that would be useful for the end-user. For example, as depicted, search results 421-428 include metadata type icons, namespace information, and names. The search results 426 and 427 further include descriptions of the respectively represented metadata items.

FIG. 4 is a depiction of but one example of a search interface suitable for practicing the described techniques. Other interfaces may have fewer or additional features, in varying arrangements. In an embodiment, for example, search results are returned each time the user enters a character in search box 410. Search results 421-428 may thus appear to fluctuate as the user enters keystrokes or changes search criteria. An autocomplete engine may be used, as discussed elsewhere, to increase the relevance of such results. The client may also receive suggestions for search terms identified by the autocomplete engine, appearing in a list adjacent to search box 410, by which the user may select query terms without typing each character of the terms.

4.4. Example Uses of Search Results

Depending on the embodiment, a user may perform any of a variety of actions with search results displayed by a client. For example, in an embodiment, a user may drag and drop any of the metadata items depicted in search results 421-428 into an adjacent graphical metadata builder. The user may then construct new metadata items which are added to the data repository.

Figure 5:
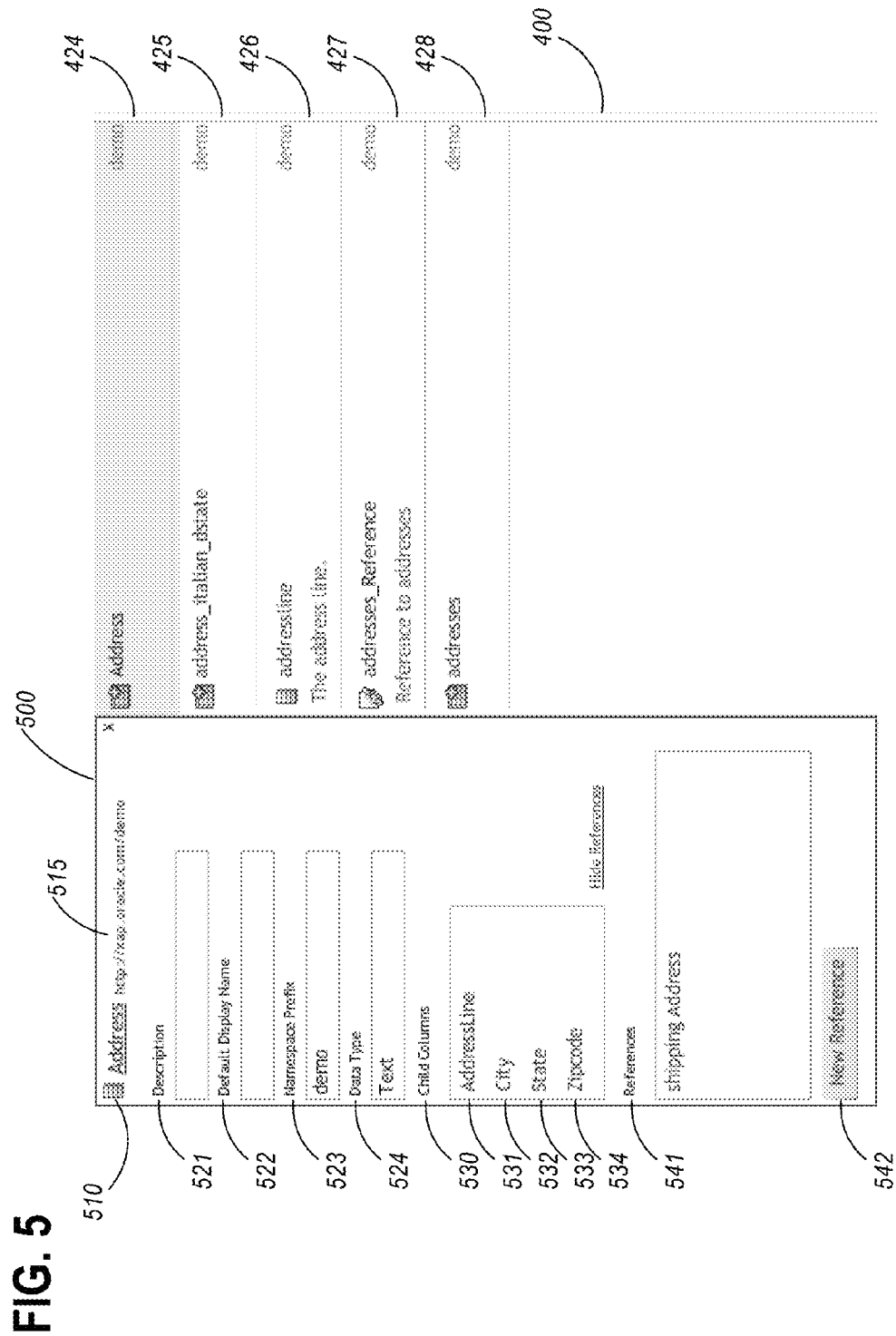
FIG. 5 is a screenshot of an information pane that is displayed upon a user selecting a search result from a search interface.

In an embodiment, selecting a particular search result 421-428 instructs the client to display additional information about the metadata item represented by the particular search result and/or provide interface controls for performing additional actions related to the metadata item represented by the particular search result. For example, FIG. 5 is a screenshot of an information pane 500 that is displayed upon a user selecting search result 424 from search interface 400, according to an embodiment. Information pane 500 displays the following information about the "demo.Address" metadata item: a name 510, complete namespace 515, description 521, default display name 522, namespace prefix 523, data type 524, child columns 530, including subelements 531-534, and referencing elements 541. Items 521-524 may be made directly editable. The search interface may be configured to perform additional actions upon selection of any of the items. For example, a user may click on name 510 to obtain access to source XML for the Address metadata item. A user may access information panes for subelements of the Address metadata item by clicking on any of items 531-534. Button 542 further allows the user to create a new metadata item that references the "demo.Address" metadata item.

Figure 6:
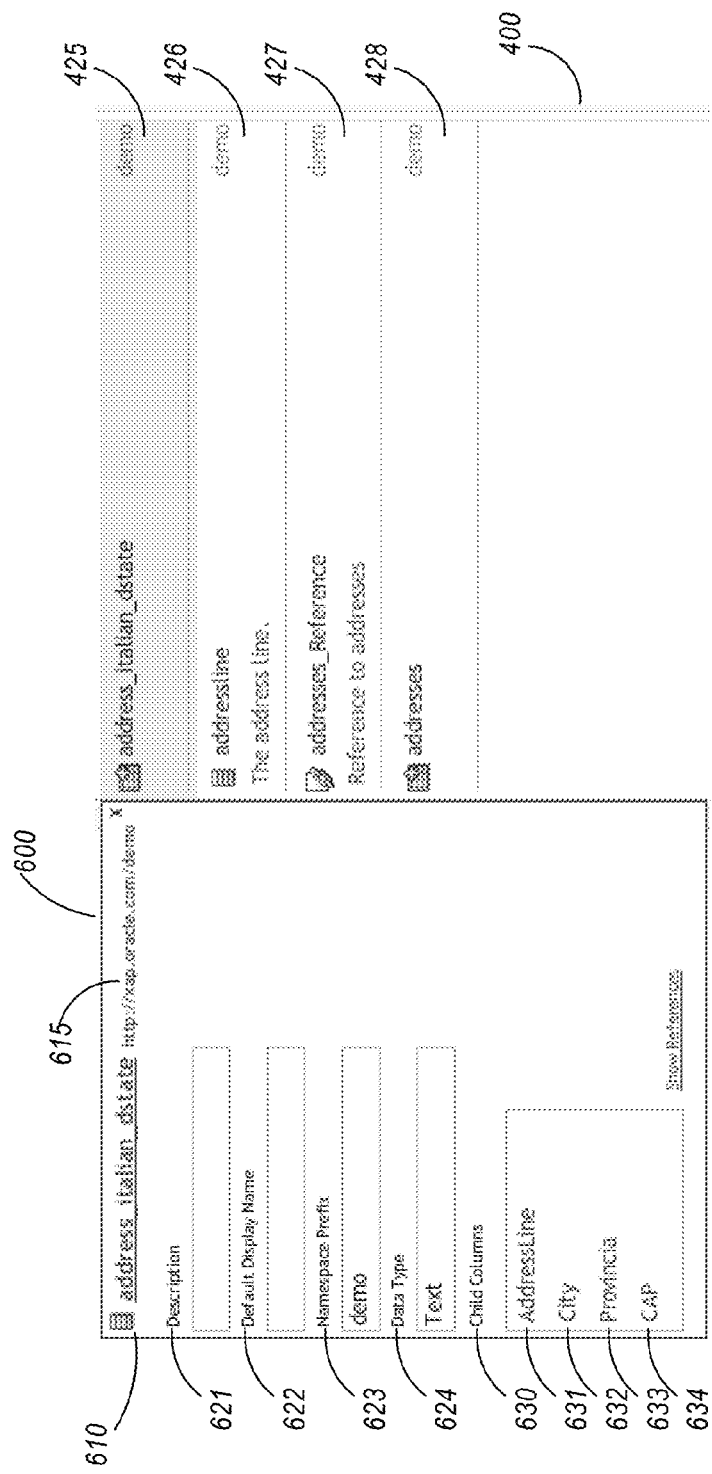
FIG. 6 is a screenshot of an information pane that is displayed upon a user selecting a search result from search interface.

FIG. 6 is a screenshot of an information pane 600 that is displayed upon a user selecting search result 425 from search interface 400, according to an embodiment. Similar to information pane 500, information pane displays the following information about the "demo.address_italian_dstate" metadata item: a name 610, complete namespace 615, description 621, default display name 622, namespace prefix 623, data type 624, child columns 630, and including subelements 631-634. FIG. 6 illustrates the reusability of the data in the "demo.Address" metadata item, in that with the exception of name 610 and subelement 633, the structure defined for the "demo.address_italian_dstate" metadata item is exactly alike that of the "demo.Address" metadata item. For example, the "demo.address_italian_dstate" metadata item may have been created in response to the user searching for the word "Address," locating the "demo.Address" metadata item, selecting an interface control that instructs the server to create a new metadata item that inherits or clones the "demo.Address" metadata item, and using information pane 600 or a similar interface to modify name 510/610 and subelement 533/633.

Figure 7:
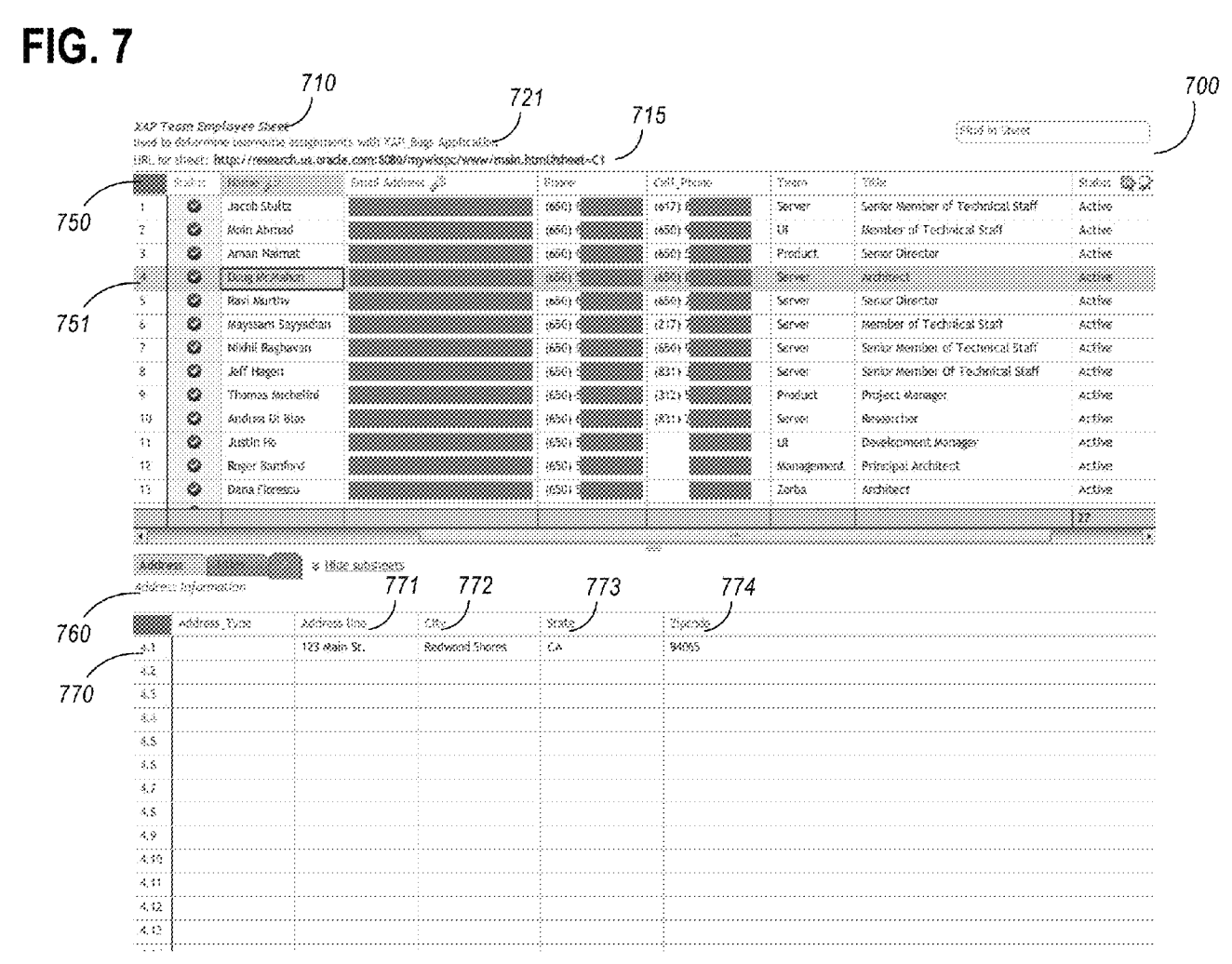

FIG. 7 is a screenshot of a data interface 700 for viewing data that conforms to the constraints defined by various metadata items, including the "demo.Address" metadata item depicted in FIG. 5, according to an embodiment. The user may have browsed to interface 700, for example, by right-clicking on the "demo.Address" search result 424 and selecting an action that instructs the interface to show data objects that are instances of the "demo.Address" metadata item. Many other techniques may also be used to browse to the data depicted in interface 700 based on metadata items depicted in search results.

FIG. 7 depicts a data object having the name 710 of "XAP Team Employee Sheet," and the description 721 of "Used to determine username assignments with XAP_Bugs Application." The data object's location in its storing data repository is referenced by location 715, which is a URL. The data object comprises a plurality of sub-objects, each of which is depicted as a row in grid 750. The rows include row 751, which depicts an employee sub-object. Both the sheet and the employee sub-objects may conform to specific metadata items, such as a metadata item for "Employee Sheets" and a metadata item for "Employee," respectively.

The sub-object depicted in row 751 is itself comprised of, among other elements, a collection of "Address" sub-objects. The collection is viewable in the Address grid 760. Address grid 760 comprises a row 770 having an address object corresponding to the employee depicted in row 751. The address object corresponds to the previously depicted "demo.Address" metadata item. Consequently, the address object comprises, among other elements, data values 771-774 for the subelements 531-534 required by the "demo.Address" metadata item.

FIG. 5-7 are depictions of but some of the many possible interfaces that are suitable for practicing the invention. Other interfaces may have fewer or additional features, in varying arrangements.

As is seen from the above example, metadata items that utilize, as part of their definition, references to other metadata items provide for tremendous flexibility and re-usability. For example, each of the above described metadata items may be referenced by other metadata items, so that metadata items such as "address" or "city" do not need to be redefined for every construct in which they are used. Among other advantages of the searching techniques described herein is the ability to more conveniently locate such metadata items so that they may be re-used, re-defined, or otherwise utilized. Many other benefits are also realized.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
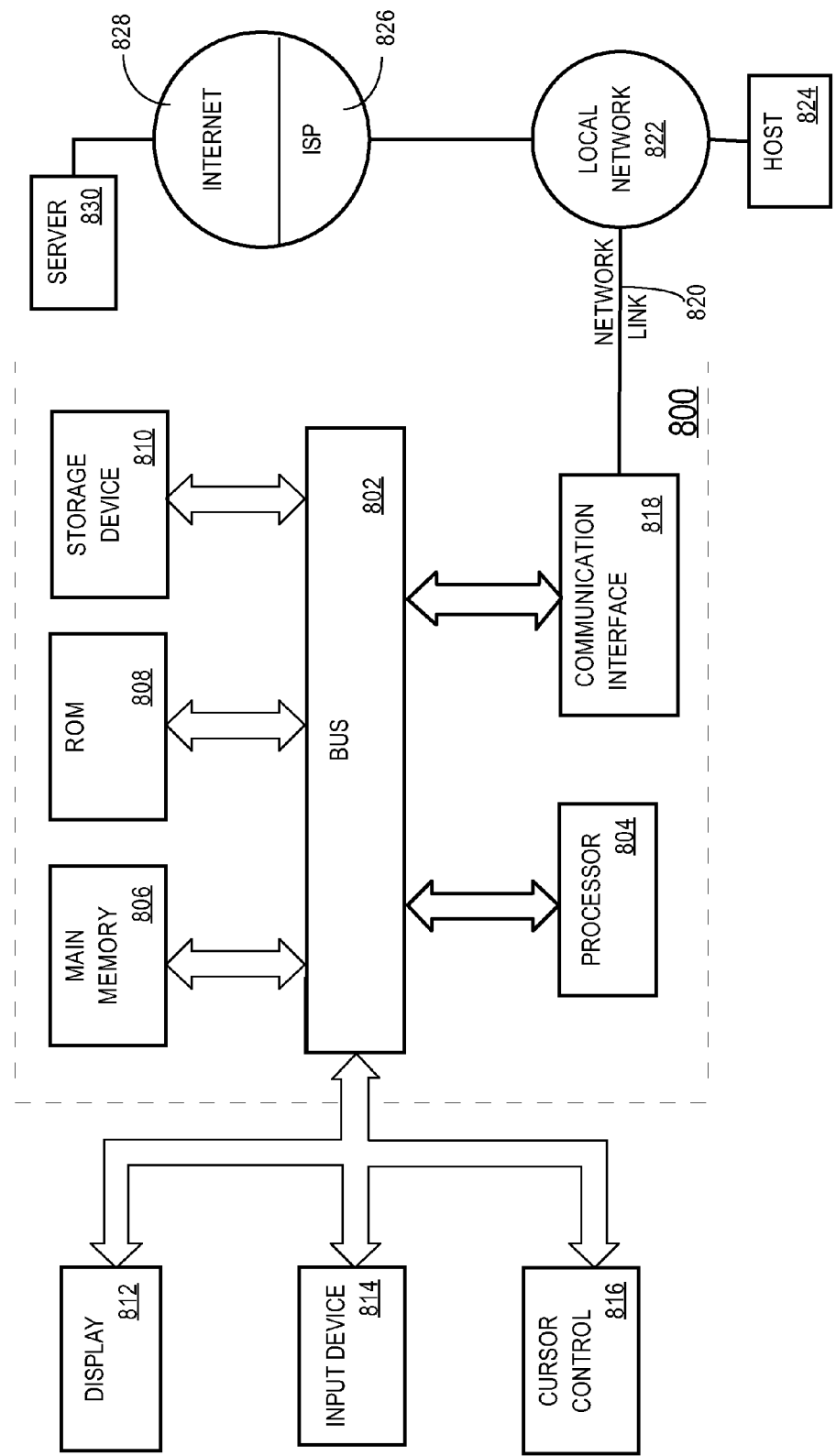
FIG. 8 is block diagram of a computer system upon which embodiments of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

6.0. Extensions And Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   accessing metadata items that specify at least structural constraints on data objects within a data repository, the metadata items being separate from the data objects for which the metadata items specify the structural constraints;
   generating an index, the index mapping the metadata items to terms associated with the metadata items;
   generating a graph describing relationships between each of the metadata items;
   receiving a search request comprising at least one or more search terms;
   based on the one or more search terms and the index, locating a candidate set of the metadata items;
   performing a link analysis of the graph to determine a relationship score for each particular metadata item in at least the candidate set of metadata items;
   for each particular metadata item in the candidate set of the metadata items, calculating a ranking score based at least on the relationship score for the particular metadata item;
   generating a ranked result set based on comparing the ranking scores for the candidate set of metadata items, the ranked result set including at least one metadata item in the candidate set;
   providing information indicating the ranked result set in response to the search request;
   wherein the method is performed by one or more computing devices.

2. The method of claim 1, further comprising:
   determining one or more term scores for at least each particular metadata item in the candidate set of metadata items, the one or more term scores being based on at least one of the frequency with which the term appears in the particular metadata item or the frequency with which the term appears in all of the metadata items;
   wherein calculating the ranking score for each particular metadata item is further based on the one or more term scores for the particular metadata item.

3. The method of claim 1, further comprising:
   for each particular metadata item in the candidate set of the metadata items, determining an instance frequency score based at least in part on how many of the data objects in the data repository are instances of the particular metadata item;
   wherein calculating the ranking score for each particular metadata item is further based on the instance frequency score for the particular metadata item.

4. The method of claim 1, further comprising:
   determining one or more term scores for at least each particular metadata item in the candidate set of metadata items, the one or more term scores being based on at least one of the frequency with which the term appears in the particular metadata item or the frequency with which the term appears in all of the metadata items;
   for each particular metadata item in the candidate set of the metadata items, determining an instance frequency score based at least in part on how many data objects in the data repository are instances of the particular metadata item;
   wherein calculating the ranking score for each particular metadata item comprises inputting at least the relationship score for the particular metadata item, the one or more term scores for the particular metadata item, and the instance frequency score into a parameterized ranking function.

5. The method of claim 4, further comprising learning weights for the parameterized ranking function based on user feedback data.

6. The method of claim 1, further comprising identifying the relationships based on reference data associating certain metadata items with other certain metadata items.

7. The method of claim 1, wherein the relationships include one or more of "child of" relationships, "parent of" relationships, "descendant of" relationships, or "ancestor of" relationships.

8. The method of claim 1, wherein the graph comprises nodes and edges, the nodes corresponding to the metadata items and the edges corresponding to the relationships, wherein at least some of the edges have different weights corresponding to different types of the relationships that are represented by the edges.

9. The method of claim 1, further comprising revising the set of one or more search terms prior to locating the candidate metadata items based on one or more of a spelling correction engine, an auto-complete engine, or a query reformulation engine.

10. The method of claim 1, wherein the relationship score for each particular metadata item is based at least in part on how many of the metadata items depend upon the particular metadata item.

11. The method of claim 1, wherein the graph is a directed graph comprising nodes and edges, the nodes corresponding to the metadata items and the edges corresponding to the relationships, wherein the relationship score for each particular metadata item is a function of how many of the edges lead into the node corresponding to the particular metadata item.

12. The method of claim 1, further comprising:
   based on the link analysis, calculating for each particular metadata item a plurality of different relationship scores reflecting different types of the relationships described in the graph, the plurality of different relationship scores including the relationship score;
   wherein the ranking score for each particular metadata item is further based on the plurality of different relationship scores.

13. The method of claim 1, further comprising:
   receiving definition data for a new metadata item that references a first metadata item in the result set;
   adding the new metadata item to the data repository;
   enforcing one or more constraints described by the new metadata item and the first metadata item on a particular data object within the data repository.

14. A method comprising:
accessing metadata items that specify at least structural constraints on data objects within a data repository, the metadata items being separate from the data objects for which the metadata items specify the structural constraints;
generating an index, the index mapping the metadata items to terms associated with the metadata items;
receiving a search request comprising at least one or more search terms;
based on the one or more search terms and the index, locating a candidate set of the metadata items;
for each particular metadata item in the candidate set of the metadata items, determining an instance frequency score based at least in part on how many of the data objects in the data repository are instances of the particular metadata item;
for each particular metadata item in the candidate set of the metadata items, calculating a ranking score based at least on the instance frequency score for the particular metadata item;
generating a ranked result set based on comparing the ranking scores for the candidate set of metadata items, the ranked result set including at least one metadata item in the candidate set;
providing information indicating the ranked result set in response to the search request;
wherein the method is performed by one or more computing devices.

15. One or more non-transitory computer-readable media storing instructions that, when executed by one or more computing devices, cause:
accessing metadata items that specify at least structural constraints on data objects within a data repository, the metadata items being separate from the data objects for which the metadata items specify the structural constraints;
generating an index, the index mapping the metadata items to terms associated with the metadata items;
generating a graph describing relationships between each of the metadata items;
receiving a search request comprising at least one or more search terms;
based on the one or more search terms and the index, locating a candidate set of the metadata items;
performing a link analysis of the graph to determine a relationship score for each particular metadata item in at least the candidate set of metadata items;
for each particular metadata item in the candidate set of the metadata items, calculating a ranking score based at least on the relationship score for the particular metadata item;
generating a ranked result set based on comparing the ranking scores for the candidate set of metadata items, the ranked result set including at least one metadata item in the candidate set;
providing information indicating the ranked result set in response to the search request;
wherein the method is performed by one or more computing devices.

16. The one or more non-transitory computer-readable media of claim 15, wherein the instructions, when executed by the one or more computing devices, further cause:
determining one or more term scores for at least each particular metadata item in the candidate set of metadata items, the one or more term scores being based on at least one of the frequency with which the term appears in the particular metadata item or the frequency with which the term appears in all of the metadata items;
wherein calculating the ranking score for each particular metadata item is further based on the one or more term scores for the particular metadata item.

17. The one or more non-transitory computer-readable media of claim 15, wherein the instructions, when executed by the one or more computing devices, further cause:
for each particular metadata item in the candidate set of the metadata items, determining an instance frequency score based at least in part on how many of the data objects in the data repository are instances of the particular metadata item;
wherein calculating the ranking score for each particular metadata item is further based on the instance frequency score for the particular metadata item.

18. The one or more non-transitory computer-readable media of claim 15, wherein the instructions, when executed by the one or more computing devices, further cause:
determining one or more term scores for at least each particular metadata item in the candidate set of metadata items, the one or more term scores being based on at least one of the frequency with which the term appears in the particular metadata item or the frequency with which the term appears in all of the metadata items;
for each particular metadata item in the candidate set of the metadata items, determining an instance frequency score based at least in part on how many data objects in the data repository are instances of the particular metadata item;
wherein calculating the ranking score for each particular metadata item comprises inputting at least the relationship score for the particular metadata item, the one or more term scores for the particular metadata item, and the instance frequency score into a parameterized ranking function.

19. The one or more non-transitory computer-readable media of claim 18, wherein the instructions, when executed by the one or more computing devices, further cause learning weights for the parameterized ranking function based on user feedback data.

20. The one or more non-transitory computer-readable media of claim 15, wherein the instructions, when executed by the one or more computing devices, further cause identifying the relationships based on reference data associating certain metadata items with other certain metadata items.

21. The one or more non-transitory computer-readable media of claim 15, wherein the relationships include one or more of "child of" relationships, "parent of" relationships, "descendant of" relationships, or "ancestor of" relationships.

22. The one or more non-transitory computer-readable media of claim 15, wherein the graph comprises nodes and edges, the nodes corresponding to the metadata items and the edges corresponding to the relationships, wherein at least some of the edges have different weights corresponding to different types of the relationships that are represented by the edges.

23. The one or more non-transitory computer-readable media of claim 15, further comprising revising the set of one or more search terms prior to locating the candidate metadata items based on one or more of a spelling correction engine, an auto-complete engine, or a query reformulation engine.

24. The one or more non-transitory computer-readable media of claim 15, wherein the relationship score for each particular metadata item is based at least in part on how many of the metadata items depend upon the particular metadata item.

25. The one or more non-transitory computer-readable media of claim 15, wherein the graph is a directed graph comprising nodes and edges, the nodes corresponding to the metadata items and the edges corresponding to the relationships, wherein the relationship score for each particular metadata item is a function of how many of the edges lead into the node corresponding to the particular metadata item.

26. The one or more non-transitory computer-readable media of claim 15, wherein the instructions, when executed by the one or more computing devices, further cause:
    based on the link analysis, calculating for each particular metadata item a plurality of different relationship scores reflecting different types of the relationships described in the graph, the plurality of different relationship scores including the relationship score;
    wherein the ranking score for each particular metadata item is further based on the plurality of different relationship scores.

27. The one or more non-transitory computer-readable media of claim 15, wherein the instructions, when executed by the one or more computing devices, further cause:
    receiving definition data for a new metadata item that references a first metadata item in the result set;
    adding the new metadata item to the data repository;
    enforcing one or more constraints described by the new metadata item and the first metadata item on a particular data object within the data repository.

28. One or more non-transitory computer-readable media storing instructions that, when executed by one or more computing devices, cause:
    accessing metadata items that specify at least structural constraints on data objects within a data repository, the metadata items being separate from the data objects for which the metadata items specify the structural constraints;
    generating an index, the index mapping the metadata items to terms associated with the metadata items;
    receiving a search request comprising at least one or more search terms;
    based on the one or more search terms and the index, locating a candidate set of the metadata items;
    for each particular metadata item in the candidate set of the metadata items, determining an instance frequency score based at least in part on how many of the data objects in the data repository are instances of the particular metadata item;
    for each particular metadata item in the candidate set of the metadata items, calculating a ranking score based at least on the instance frequency score for the particular metadata item;
    generating a ranked result set based on comparing the ranking scores for the candidate set of metadata items, the ranked result set including at least one metadata item in the candidate set;
    providing information indicating the ranked result set in response to the search request;
    wherein the method is performed by one or more computing devices.

29. The method of claim 1, wherein the metadata items are schema elements.

30. The one or more non-transitory computer-readable media of claim 15, wherein the metadata items are schema elements.

* * * * *